(12) United States Patent
Huang

(10) Patent No.: US 7,107,655 B1
(45) Date of Patent: Sep. 19, 2006

(54) STRAP TENSER

(76) Inventor: Han-Ching Huang, No. 12, Alley 111, Lane 437, Chen Hsing Road, Taichung (TW)

(*) Notice: Subject to any disclaimer, the term of this patent is extended or adjusted under 35 U.S.C. 154(b) by 0 days.

(21) Appl. No.: 10/906,723

(22) Filed: Mar. 3, 2005

(51) Int. Cl.
*A44B 21/00* (2006.01)

(52) U.S. Cl. ............... 24/68 CD; 24/68 D; 24/68 T; 24/71 ST; 254/218; 254/217

(58) Field of Classification Search ............ 24/68 CD, 24/68 D, 68 T, 71 ST, 71 R, 71.1; 254/217, 254/218, 223; 242/388.1
See application file for complete search history.

(56) References Cited

U.S. PATENT DOCUMENTS

| | | | |
|---|---|---|---|
| 5,611,520 A * | 3/1997 | Soderstrom | 254/218 |
| 6,195,848 B1 * | 3/2001 | Jackson et al. | 24/68 CD |
| 6,547,218 B1 * | 4/2003 | Landy | 254/217 |
| 6,609,275 B1 * | 8/2003 | Lin | 24/68 CD |
| 6,711,786 B1 * | 3/2004 | Mamie et al. | 24/68 CD |

* cited by examiner

*Primary Examiner*—Robert J. Sandy
*Assistant Examiner*—Marcus Menezes
(74) *Attorney, Agent, or Firm*—Alan D. Kamrath; Nikolai & Mersereau, P.A.

(57) ABSTRACT

A strap tenser includes a frame, a pin, a handle and an automatic reeling device. The pin is installed on the frame. The handle is pivotally installed on the pin. The handle includes a crossbar around which a first strap is wound after it is wound around the pin. The automatic reeling device includes a pin, a wheel, a cap, a crossbar and a spiral spring. The pin is installed on the frame and connected with an end of the second strap. The wheel is rotationally installed on the pin of automatic reeling device. The cap is rotationally installed on the pin thereof. The crossbar extends between the wheel and the cap eccentrically for reeling in the second strap. The spiral spring includes a first end secured to the frame and a second end secured to the cap.

8 Claims, 6 Drawing Sheets

STRAP TENSER

BACKGROUND OF INVENTION

1. Field of Invention

The present invention relates to a strap tenser and, more particularly, to a strap tenser with an automatic reeling device.

2. Related Prior Art

In U.S. Pat. No. 6,609,275, a strap-tightening apparatus includes an auto-pulling device 10 connected with a U-shaped seat 60. The auto-pulling device 10 includes a housing 11 and a reversing device 12. The reversing device 12 is put rotationally in the housing 11. The reversing device 12 includes a reel 121 and a spiral power spring 122. The reel 121 is put rotationally in the housing 11. An end of a strap 30 is attached to the reel 121 so that the strap 30 can be wound about the reel 121. The spiral power spring 122 is put in the housing 11. The spiral power spring 122 includes a first end secured to the housing and a second end secured to an internal periphery of the reel 121. Thus, the strap 30 can automatically be wound around the reel 121. The auto-pulling device 10 is however bulky because the diameter thereof is big since the spiral power spring 122 is located in the reel 121.

The present invention is therefore intended to obviate or at least alleviate the problems encountered in prior art.

SUMMARY OF INVENTION

According to the present invention, a strap tenser includes a frame, a pin, a handle and an automatic reeling device. The pin is installed on the frame. The handle is pivotally installed on the pin. The handle includes a crossbar around which a first strap is wound after it is wound around the pin. The automatic reeling device includes a pin, a wheel, a cap, a crossbar and a spiral spring. The pin is installed on the frame and connected with an end of the second strap. The wheel is rotationally installed on the pin of automatic reeling device. The cap is rotationally installed on the pin thereof. The crossbar extends between the wheel and the cap eccentrically for reeling in the second strap. The spiral spring includes a first end secured to the frame and a second end secured to the cap.

The primary advantage of the strap tenser of the present invention is its small size because the spiral spring is not located inside any reel and therefore does not increase the diameter of any reel.

Other advantages and novel features of the invention will become more apparent from the following detailed description in conjunction with the attached drawings.

BRIEF DESCRIPTION OF DRAWINGS

The present invention will be described through detailed illustration of the preferred embodiment referring to the drawings.

DETAILED DESCRIPTION OF PREFERRED EMBODIMENT

Figure 1:
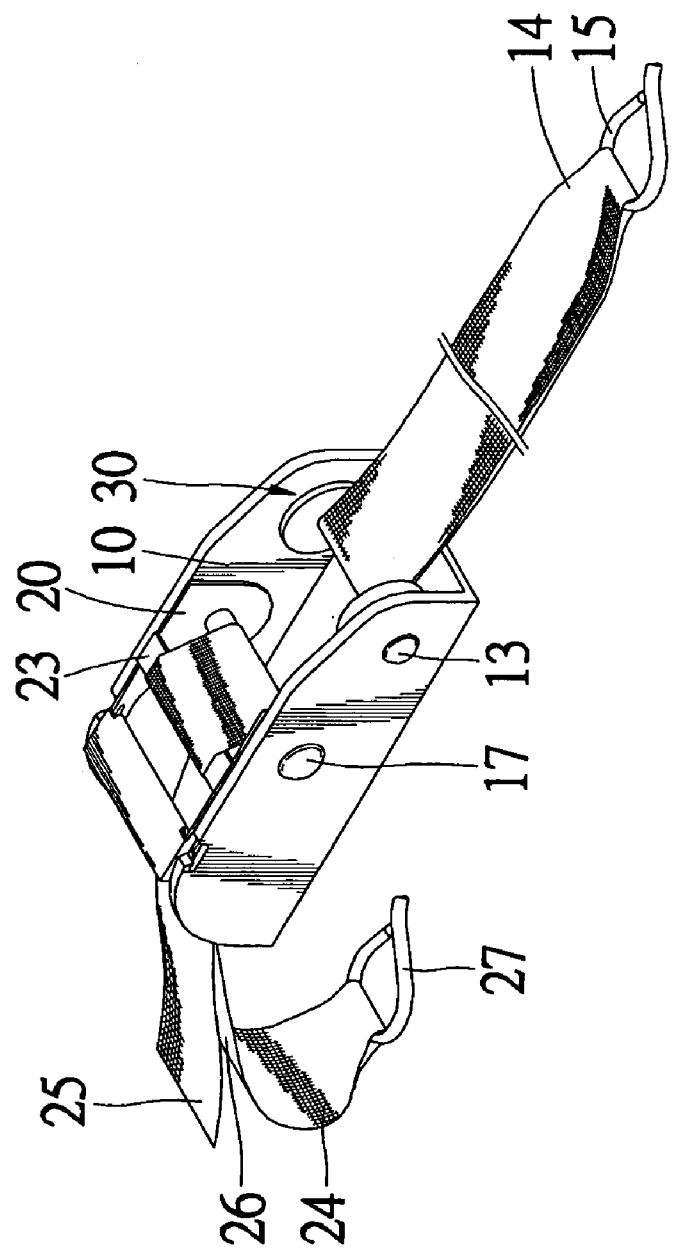
FIG. 1 is a perspective view of a strap tenser according to the preferred embodiment of the present invention.

Referring to FIG. 1, according to the preferred embodiment of the present invention, a strap tenser includes a frame 10, a handle 20 and an automatic reeling device 30.

Figure 2:
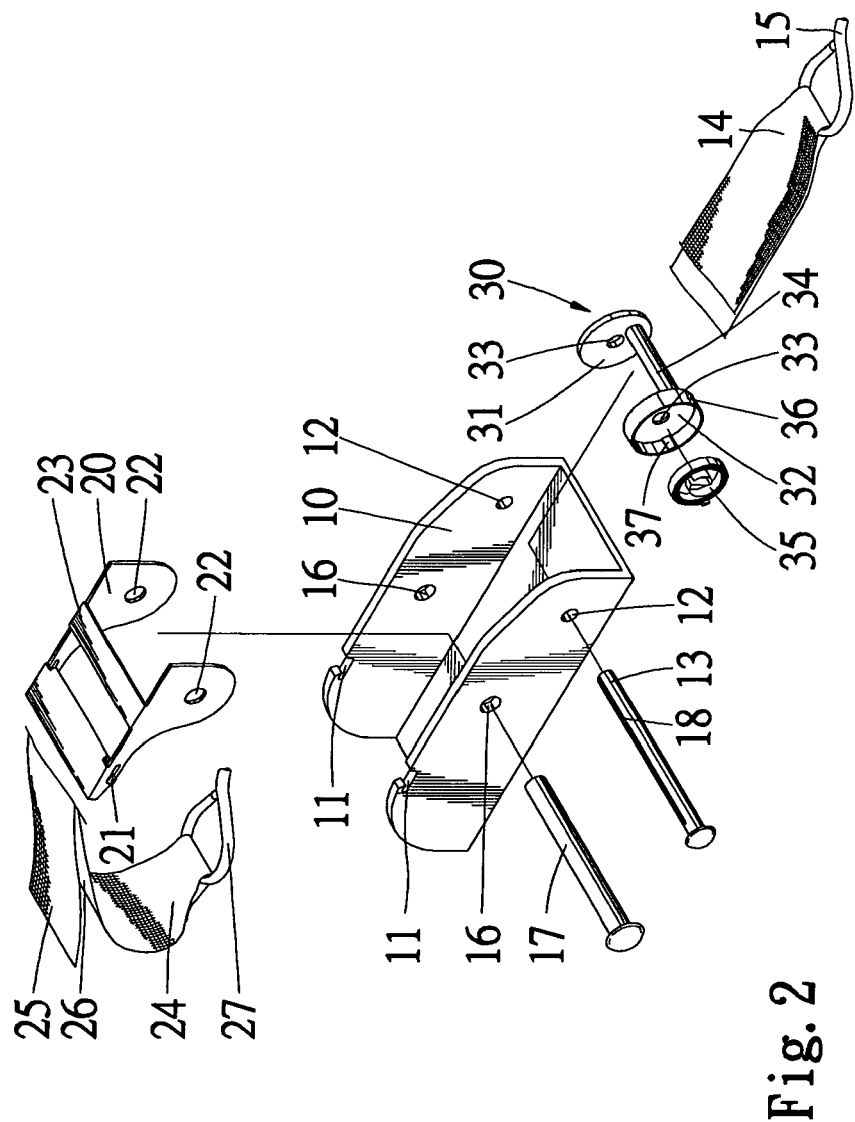
FIG. 2 is an exploded view of the strap tenser shown in FIG. 1.
Figure 3:
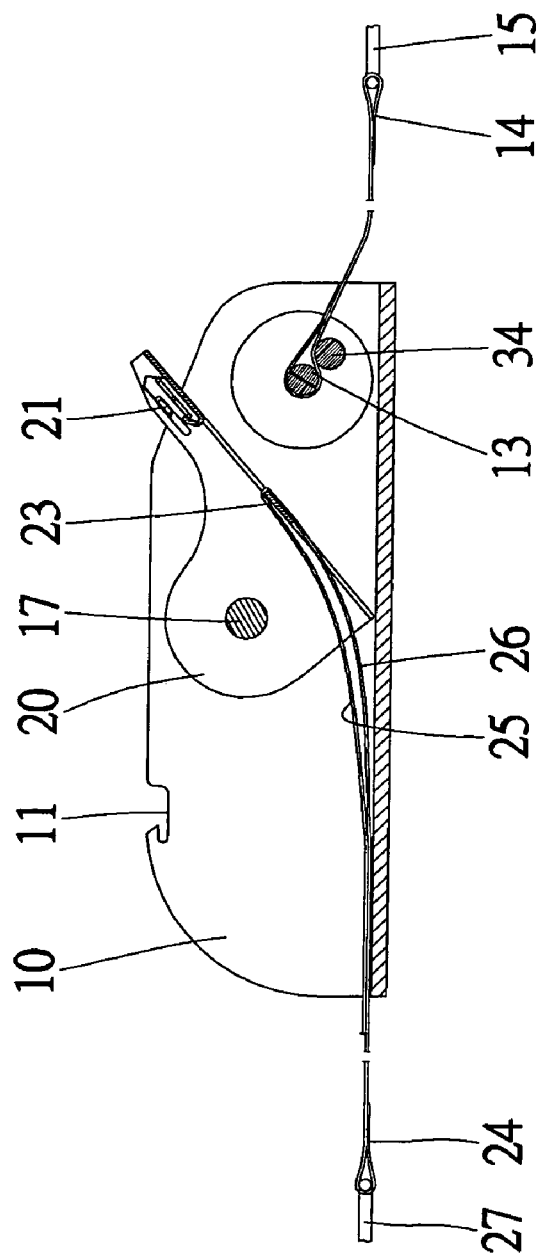
FIG. 3 is a cross-sectional view of the strap tenser shown in FIG. 1.

Referring to FIGS. 2 and 3, the frame 10 includes two side members and a central member formed between the side members. Each side member includes a recess 11 defined in the edge near an end, an aperture 12 defined in an opposite end and an aperture 16 defined substantially in the middle.

The handle 20 includes two levers, a grip extending between the levers and a crossbar 23 extending between the levers. A spring-biased tent 21 is installed on each lever. Each lever includes an aperture 22 defined in an end. A pin 17 is inserted in the apertures 16 and 22 in order to install the handle 20 on the frame 10 pivotally. A first strap 24 is wound around the pin 17 before it is wound around the crossbar 23. A hook 27 is connected with a first end 26 of the first strap 24. A second end 26 of the first strap 24 can be pulled in order to tense the firs strap 24.

The automatic reeling device 30 includes a pin 13, a wheel 31, a cap 32, a crossbar 34 and a spiral spring 35. The crossbar 34 extends between the wheel 31 and the drum 32. The wheel 31 defines a central aperture 33. The cap 32 defines a central aperture 33 and includes a tab 37 formed on the interior.

The spiral spring 35 is put in the cap 32. A first end of the spiral spring 35 is bent in order to hook the tab 37.

The pin 13 is inserted in the apertures 12 and the central apertures 33 in order to install the wheel 31 and the cap 32 on the frame 10 rotationally. The pin 13 is secured to the frame 10 by means of soldering. The pin 13 defines a slit 18 for receiving a second end of the spiral spring 35.

A second strap 14 includes an end connected with a hook 15 and an opposite end formed with a loop in which the pin 13 is inserted. The second strap 14 is wound around the pin 18 and the crossbar 34.

Referring to FIG. 3, to use the strap tenser, the handle 20 is put in a relaxing position where the first strap 24 can be pulled from the strap tenser. The second strap 14 is reeled out. When the second strap 14 is reeled out, the spiral spring 35 is stressed. The hooks 27 and 15 are hooked to a truck (not shown) for example so that the straps 24 and 14 are put on cargo on the truck. Then, the first end 25 of the first strap 24 is pulled.

Figure 4:
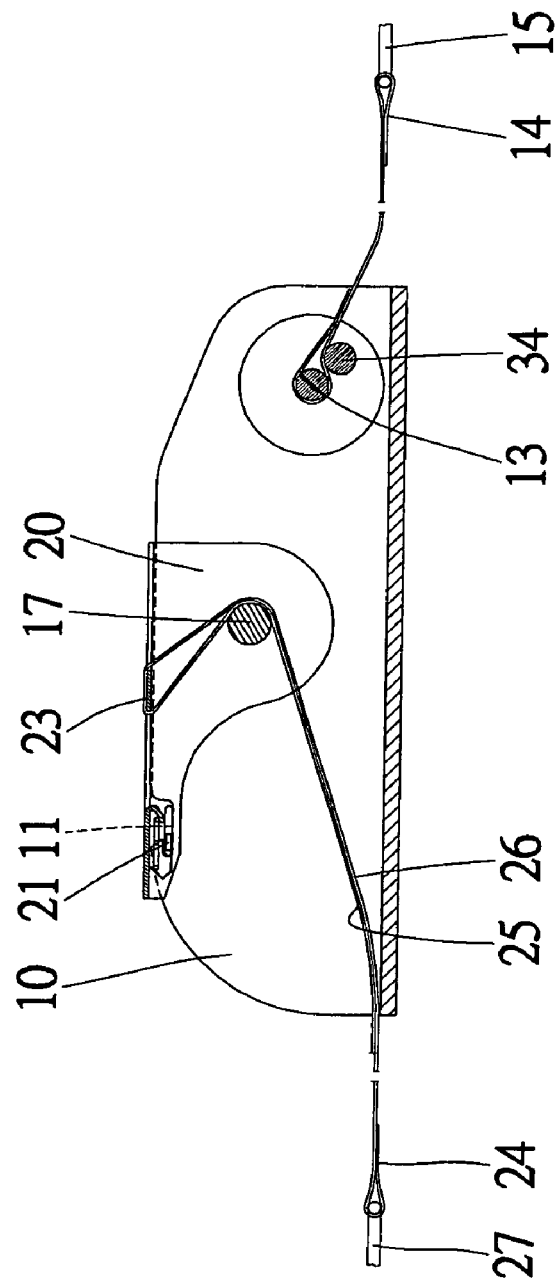
FIG. 4 is similar to FIG. 3 but shows the strap tenser in a different position.

Referring to FIG. 4, the handle 20 is pivoted to a tensing position in order to tense the straps 24 and 14. The spring biased detents 21 are put in the recesses 11. Thus, the straps 24 and 14 are kept tensed. The handle 20 and the spring-biased detents 21 are conventional and will not be described further in detail.

Figure 5:
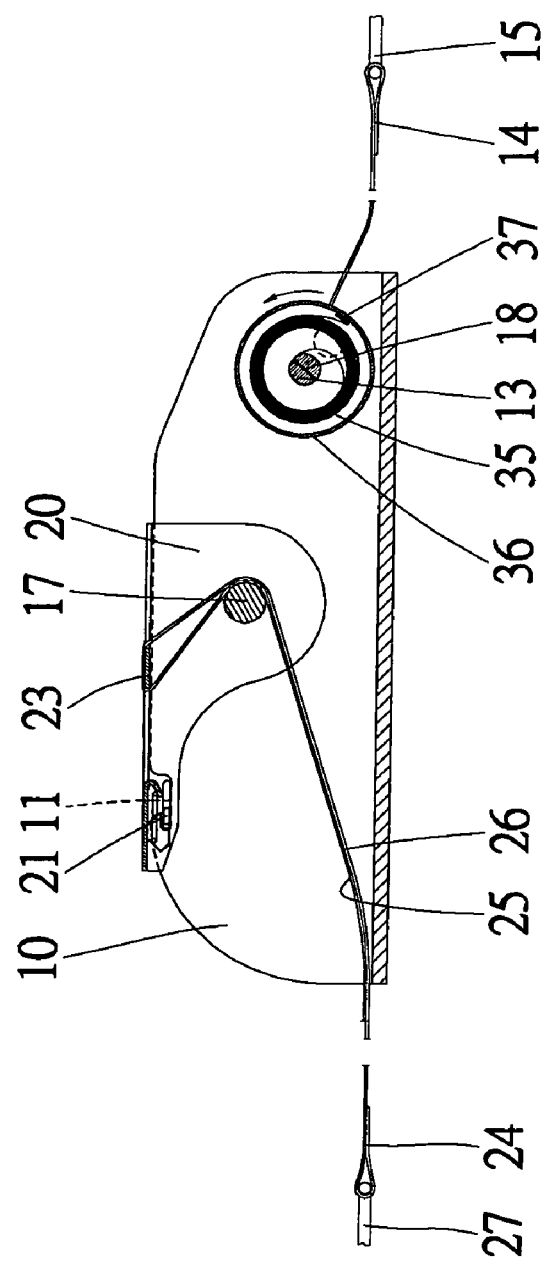
FIG. 5 is another cross-sectional view of the strap tenser of FIG. 3.
Figure 6:
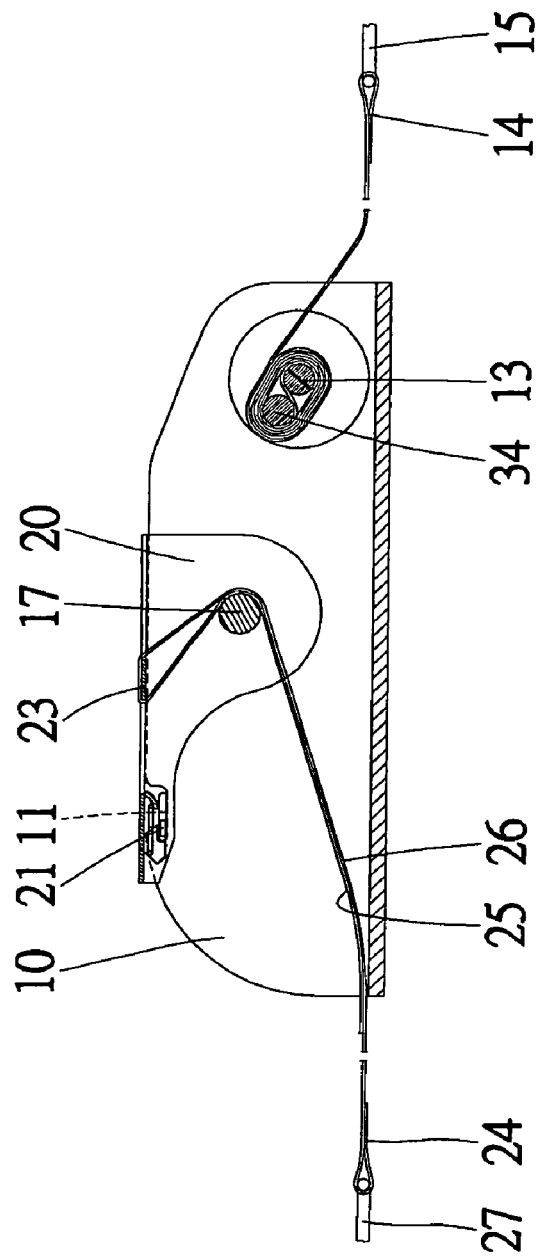
FIG. 6 is similar to FIG. 4 but shows the strap tenser in a different position.

Referring to FIGS. 5 and 6, when the hook 15 is released from the truck, the stressed spiral spring 35 is allowed to rotate the wheel 31, the cap 32 and the crossbar 34. Thus, the second strap 14 is reeled in.

The present invention has been described through detailed illustration of the preferred embodiment. Those skilled in the art can derive variations from the preferred embodiment without departing from the scope of the present invention. Therefore, the preferred embodiment shall not limit the scope of the present invention defined in the claims.

What is claimed is:

1. A strap tenser comprising:
   a frame;
   a pin installed on the frame;
   a handle pivotally installed on the pin, the handle comprising a crossbar around which a first strap is wound after it is wound around the pin; and
   an automatic reeling device comprises a pin installed on the frame and connected with an end of the second strap, a wheel rotationally installed on the pin thereof, a cap rotationally installed on the pin thereof, a crossbar extending between the wheel and the cap eccentrically for reeling in the second strap and a spiral spring comprising a first end secured to the frame and a second end secured to the cap.

2. The strap tenser according to claim 1 wherein the spiral spring is capped in the cap.

3. The strap tenser according to claim 1 wherein the spiral spring is installed on the pin of the automatic reeling device.

4. The strap tenser according to claim 3 wherein the first end of the spiral spring is connected with the pin of the automatic reeling device.

5. The strap tenser according to claim 4 wherein the pin of the automatic reeling device defines a slit for receiving the first end of the spiral spring.

6. The strap tenser according to claim 1 wherein the cap comprises a tab formed thereon, wherein the second end of the spiral spring is bent for hooking the tab.

7. The strap tenser according to claim 1 wherein the handle can be pivoted between a relaxing position and a tensing position.

8. The strap tenser according to claim 3 wherein the frame defines at least one recess, wherein the handle comprises at least one spring-biased detent that can be put in the recess of the frame when the handle is in the tensing position.

* * * * *